(12) United States Patent
Callegari et al.

(10) Patent No.: US 11,298,966 B2
(45) Date of Patent: Apr. 12, 2022

(54) THIN OPTICAL SECURITY ELEMENT AND METHOD OF DESIGNING IT

(71) Applicant: SICPA HOLDING SA, Prilly (CH)

(72) Inventors: Andrea Callegari, Chavannes-près-Renens (CH); Pierre Degott, Mollie-Margot (CH); Todor Dinoev, Chavannes-près-Renens (CH); Christophe Garnier, Reignier (FR); Alain Mayer, Saint-George (CH); Yuliy Schwartzburg, Lausanne (CH); Romain Testuz, Lausanne (CH); Mark Pauly, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 67 days.

(21) Appl. No.: 16/652,365

(22) PCT Filed: Sep. 28, 2018

(86) PCT No.: PCT/EP2018/076433
§ 371 (c)(1),
(2) Date: Mar. 30, 2020

(87) PCT Pub. No.: WO2019/063778
PCT Pub. Date: Apr. 4, 2019

(65) Prior Publication Data
US 2020/0269627 A1    Aug. 27, 2020

(30) Foreign Application Priority Data
Sep. 29, 2017    (EP) .................................... 17194207

(51) Int. Cl.
*G02B 5/18*    (2006.01)
*B42D 25/23*    (2014.01)
(Continued)

(52) U.S. Cl.
CPC ........... *B42D 25/324* (2014.10); *B42D 25/23* (2014.10); *B42D 25/24* (2014.10); *B42D 25/29* (2014.10);
(Continued)

(58) Field of Classification Search
CPC ...... B42D 25/324; B42D 25/23; B42D 25/24; B42D 25/29; B42D 25/425; B42D 25/435;
(Continued)

(56) References Cited

U.S. PATENT DOCUMENTS 10,127,755 B2    11/2018 Holmes
10,391,519 B2    8/2019 Degott et al.
(Continued)

FOREIGN PATENT DOCUMENTS

AU    2011101251 A4 *    11/2011
CN    101715589 A    5/2010
(Continued)

OTHER PUBLICATIONS

Chinese Office Action in counterpart Chinese Application No. 201880063326.5 dated Apr. 20, 2021 (and English language translation of the Office Action).
(Continued)

*Primary Examiner* — Justin V Lewis
(74) *Attorney, Agent, or Firm* — Muncy, Geissler, Olds & Lowe, P.C.

(57) ABSTRACT

The invention relates to a thin optical security element comprising a reflective or refractive light-redirecting surface having a relief pattern operable to redirect incident light from a light source and form a projected image on a projection surface, the projected image comprising a caustic pattern reproducing a reference pattern that is easily visually recognizable by a person. The invention also relates to a
(Continued)

method for designing a relief pattern of a light-redirecting surface of a thin optical security element.

11 Claims, 7 Drawing Sheets

(51) Int. Cl.
  *B42D 25/24* (2014.01)
  *B42D 25/29* (2014.01)
  *B42D 25/425* (2014.01)
  *B42D 25/435* (2014.01)
  *B42D 25/324* (2014.01)

(52) U.S. Cl.
  CPC ......... *B42D 25/425* (2014.10); *B42D 25/435* (2014.10); *G02B 5/1842* (2013.01); *G02B 5/1847* (2013.01); *G02B 5/1861* (2013.01); *G02B 5/1866* (2013.01)

(58) Field of Classification Search
  CPC .............. G02B 5/18467; G02B 5/1866; G02B 5/1861; G02B 5/1842; G02B 5/18
  USPC .................... 283/67, 70, 72, 74, 94, 98, 901
  See application file for complete search history.

(56) References Cited

U.S. PATENT DOCUMENTS

| | | | |
|---|---|---|---|
| 2010/0200649 A1 | 8/2010 | Callegari et al. | |
| 2015/0362443 A1* | 12/2015 | Evans | G01N 23/2055 378/4 |

FOREIGN PATENT DOCUMENTS

| | | |
|---|---|---|
| CN | 102858554 A | 1/2013 |
| CN | 105792948 A | 7/2016 |
| CN | 106978766 A | 7/2017 |
| DE | 102007019522 | 10/2008 |
| DE | 102010049617 | 4/2012 |
| EP | 2711745 | 3/2014 |
| EP | 2927013 | 10/2015 |
| EP | 2963464 | 1/2016 |
| EP | 2038692 | 4/2016 |
| WO | 2008131852 | 11/2008 |
| WO | 2011138394 | 11/2011 |
| WO | 2012055505 | 5/2012 |

OTHER PUBLICATIONS

International Search Report and Written Opinion issued with respect to application No. PCT/EP2018/076433.
International Preliminary Report on Patentability issued with respect to application No. PCT/EP2018/076433.
Indian First Examination Report in counterpart Indian Application No. 202017005835 dated Jul. 16, 2021.

* cited by examiner

THIN OPTICAL SECURITY ELEMENT AND METHOD OF DESIGNING IT

TECHNICAL FIELD

The present invention relates to the technical field of reflective or refractive optical security elements operable to project caustic patterns upon appropriate illumination, and method for designing such optical security elements.

BACKGROUND ART

There is a need for security features on objects, that can be authenticated by the so-called "person in the street", using commonly available means. These means include using the five senses—mostly, sight and touch—plus using widespread tools, such as for example a mobile phone.

Some common examples of security features are forensic fibers, threads or foils (incorporated into a substrate like paper for example), watermarks, intaglio printing or micro-printing (possibly printed on a substrate with optically variable inks) which can be found on banknotes, credit cards, ID's, tickets, certificates, documents, passports etc. These security features can include optically variable inks, invisible inks or luminescent inks (fluorescing or phosphorescing under appropriate illumination with specific excitation light), holograms, and/or tactile features. A main aspect of a security feature is that it has some physical property (optical effect, magnetic effect, material structure or chemical composition) that is very difficult to counterfeit so that an object marked with such a security feature may be reliably considered as genuine if the property can be observed or revealed (visually or by means of a specific apparatus).

However, when the object is transparent, or partially transparent, these features may not be appropriate. In fact, transparent objects often require that the security element having the required security features does not change their transparency or their appearance, either for aesthetic or for functional reasons. Notable examples may include blisters and vials for pharmaceutical products. Recently, for example, polymer and hybrid banknotes have incorporated in their design a transparent window, thus generating the desire for security features that are compatible with it.

Most existing security features of security elements for documents, banknotes, secured tickets, passports, etc. have not been specifically developed for transparent objects/areas and, as such, are not well-suited for such an application. Other features, for example, those obtained with invisible and fluorescent inks require specific excitation tools and/or detection tools, which may not be readily available for "the person in the street".

Semi-transparent optically variable features (e.g. liquid crystal coatings, or latent images from surface structures) are known and can provide this kind of functionality. Unfortunately, the marking incorporating such security features generally must be observed against a dark/uniform background for the effect to be well visible.

Other known features are diffractive optical elements, such as non-metalized surface holograms. A disadvantage with these features is that they show a very low contrast visual effect when viewed directly. Furthermore, when used in combination with a monochromatic light source to project a pattern, they typically require a laser to give a satisfactory result. Moreover, a quite precise relative spatial arrangement of the light source, the diffractive optical element and the user's eyes is required in order to provide a clearly visible optical effect.

Laser engraved micro-text and or micro-codes have been used for e.g. glass vials. However, they require expensive tools for their implementation, and a specific magnifying tool for their detection.

It is therefore an object of the invention to provide an optical security element for transparent or partially transparent objects (or substrates), that has security features that can be easily authenticated visually by a person, using either no further means (i.e. with naked eye) or commonly and easily available means (e.g. mere magnifying lens). Another goal of the invention is to provide an optical security element easy to manufacture in large numbers, or compatible with mass-production manufacturing processes. Moreover, illumination of the optical security element should also be possible with easily available means (e.g. a light source like an LED of a mobile phone, or the sun), and the conditions for good visual observation by a user should not require a too strict relative spatial arrangement of the light source, the optical security element and the user's eyes.

Further, most of the objects listed above have a reduced size, at least in one dimension (e.g. a banknote may only be less than 100 µm thick). It is therefore a further object of this invention to provide a thin optical security element that is compatible with objects of reduced dimensions (e.g. thickness below 300 µm).

It is a further object of this invention to provide an efficient method to design a very thin optical security element operable to provide under illumination a visual effect in accordance with a selected target visual effect. Moreover, this method should be compatible with mass-production of such a thin optical security element.

SUMMARY OF THE INVENTION

According to one aspect the invention relates to an optical security element comprising a reflective light-redirecting surface, or refractive transparent or partially transparent light-redirecting surface, having a relief pattern operable to redirect incident light from a light source and form a projected image on a projection surface, such that the projected image comprises a caustic pattern reproducing a reference pattern that is easily recognizable by a person, using no further means (i.e. with naked eye) or common and easily available means, so that an object marked with this optical security element can be readily authenticated visually by the person. A reduced thickness of the relief pattern of optical security element makes it particularly suitable for marking objects of reduced dimensions like banknotes or security documents (e.g. identity papers, passports, cards etc.) for example. According to the invention, a very thin optical security element with relief pattern having machined profile with abrupt variations and of low depth $\delta_f$ is obtained by controlling the machining process so as to reproduce a calculated relief profile having discontinuities. Indeed, numerous tests confirmed that a calculated relief profile with discontinuities is compatible with a projection of an image having the above mentioned recognizable caustic pattern. The transparent aspect of the refractive optical security element makes it particularly suitable for marking at least partially transparent substrates (e.g. glass or plastic bottles, bottle caps, watch glasses, jewelry, gems, etc.). Preferably, the refractive optical security element is transparent (or partially transparent) to the visible light (i.e. for light wavelengths from about 380 nm to about 740 nm).

In view of the great difficulty to determine reference patterns that can be conveniently reproduced by a projected caustic pattern on a projection surface so as to be visually recognizable by a person, particularly when the relief pattern of the optical security element must be very thin (i.e. typically with relief depth $\delta_f$ below 250 µm), and also the difficulty to calculate a corresponding very thin relief pattern to be machined on a surface of an optical material piece to form a suitable light-redirecting surface, another aspect of the invention relates to a method for efficiently designing a relief pattern of a light-redirecting surface of an optical security element by:

starting from an initial continuous (or piecewise continuous) profile of a model light-redirecting surface with a relief pattern of depth $\delta_i$ greater than $\delta_f$, i.e. having a depth constraint much easier to cope with in order to both allow conveniently reproducing a target reference pattern and determining a corresponding relief pattern continuous profile, but which would provide a too thick optical security element in view of the target $\delta_f$;

transforming said initial profile into a relief profile having discontinuities by specifically collapsing onto a plane the initial continuous (or piecewise continuous) profile while thinning it and preserving its ability to provide a machined relief pattern capable of projecting a caustic pattern on a projection surface corresponding to the target reference pattern and being visually recognizable by a person.

This method is particularly efficient for designing very thin relief patterns convenient for visual authentication of marked objects (i.e. of depth less or equal than 250 µm, or even less or equal than 30 µm) and allows significantly accelerating the design process operations of an optical security element, while allowing more flexibility in the choice of a target reference pattern.

Thus, according to one aspect, the invention relates to an optical security element comprising a reflective light-redirecting surface, or a refractive transparent or partially transparent light-redirecting surface, having a relief pattern of depth $\delta_f$ adapted to redirect incident light received from a point-like source and form a projected image containing a caustic pattern on a projection surface, said caustic pattern reproducing a reference pattern and being visually recognizable, wherein a profile of the relief pattern has abrupt variations formed by machining a surface of an optical material piece according to a calculated relief profile having discontinuities, said machined abrupt variations corresponding to the discontinuities.

Preferably, the calculated relief pattern profile is obtained by:
i) slicing an initial (possibly continuous) relief pattern profile of a model light-redirecting surface into smaller contiguous profile portions, said initial relief pattern profile having a depth $\delta_i$ greater than $\delta_f$ and being operable to reproduce by optical path simulation said caustic pattern on the projection surface under illumination by the point-like source, the slicing generating a boundary surface between any two contiguous profile portions which extends parallel to an optical axis of said model light-redirecting surface, and
ii) collapsing along the optical axis each profile portion comprised between two consecutive boundary surfaces, thereby forming the calculated relief profile having a discontinuity along each boundary surface.

According to the invention, the operation of collapsing a profile portion of the initial relief pattern profile, of which height is measured with respect to the optical axis of said model light-redirecting surface and which extends above a base plane perpendicular to said optical axis, is obtained by translating, parallel to the optical axis and toward the base plane, the profile portion by a distance value corresponding to a minimal height at which its boundary surfaces intersect said profile portion, thereby obtaining the calculated relief profile having a relief pattern of reduced depth less than $\delta_i$.

Thus, a thinner relief pattern can be machined and a thinner optical security element can be formed, while preserving the capability to project a caustic pattern (on a projection surface) reproducing the reference pattern and being visually recognizable by a person, according to the initial thick relief pattern.

In order to provide very thin optical security elements, the value of depth $\delta_f$ of the relief pattern can be less than or equal to 250 µm, or even less than or equal to 30 µm. Moreover, the optical security element may further have its relief pattern disposed over a flat base substrate, an overall thickness of the optical security element being less than or equal to 100 µm.

Preferably, in order to make even easier operations of authentication by visual recognition of the reference pattern from the projected caustic pattern, the optical security element may further have its relief pattern adapted to redirect incident light received from the point-like source, at a distance $d_s$ from the light-redirecting surface, and form the projected image containing the caustic pattern on the projection surface at a distance $d_i$ from the light-redirecting surface, with a value of $d_i$ less than or equal to 30 cm and a value of the ratio $d_s/d_i$ greater than or equal to 5. Moreover, the projection surface is preferably flat.

The optical security element according to the invention can be used to mark many different types of objects, and particularly can mark an object selected from the group comprising: consumer products, tax stamps, ID cards, passports, credit cards and banknotes.

According to another aspect, the invention relates to a method of designing a reflective light-redirecting surface, or a refractive transparent or partially transparent light-redirecting surface, having a relief pattern of depth $\delta_f$, of an optical security element adapted to redirect incident light received from a point-like source and form a projected image containing a caustic pattern on a projection surface, said caustic pattern reproducing a reference pattern and being visually recognizable, comprising the steps of:
a) calculating a relief profile having discontinuities; and
b) machining a surface of an optical material piece according to the relief profile having discontinuities calculated at step a), thereby having a machined profile of the relief pattern with abrupt variations corresponding to the discontinuities of the relief profile calculated at step a).

Preferably, at step a) of the method of designing the light-redirecting surface according to the invention, calculating the relief pattern profile having discontinuities is performed by the following further steps of:
slicing an initial relief pattern profile of a model light-redirecting surface into smaller contiguous profile portions, said initial relief pattern profile having a depth $\delta_i$ greater than $\delta_f$ and being operable to reproduce by optical path simulation said caustic pattern on the projection surface under illumination by the point-like source, the slicing generating a boundary surface between any two contiguous profile portions which extends parallel to an optical axis of said model light-redirecting surface; and
collapsing along the optical axis each profile portion comprised between two consecutive boundary surfaces, thereby forming the calculated relief profile having a discontinuity along each boundary surface.

More preferably, in the above method of designing the light-redirecting surface according to the invention:

at step a), the further step of collapsing a profile portion of the initial relief pattern profile, of which height is measured with respect to the optical axis of said model light-redirecting surface and which extends above a base plane perpendicular to said optical axis, is performed by translating, parallel to the optical axis and toward the base plane, the profile portion by a distance value corresponding to a minimal height at which its boundary surfaces intersect said profile portion, thereby obtaining the calculated relief profile having a relief pattern of reduced depth less than $\delta_i$; and at step b), the surface of the optical material piece is machined according to the calculated relief pattern profile of reduced depth less than $\delta_i$, thereby obtaining the light-redirecting surface of the optical security element with the relief pattern of reduced depth $\delta_f$ less than $\delta_i$.

At step b) of the method, the machining of the surface of the optical material piece may comprise any one of ultra-precision machining (UPM), laser ablation and lithography.

The machined light-redirecting surface according to the method may be a master light-redirecting surface to be used to build a replica of the light-redirecting surface by molding technique (or replicas for mass-production of optical security elements), and may be replicated on a substrate (for example, to form a marking applicable on an object). Replication of the machined light-redirecting surface may comprise any one of UV casting and embossing (e.g. in a roll-to-roll or foil-to-foil production process).

The present invention will be described more fully hereinafter with reference to the accompanying drawings in which like numerals represent like elements throughout the different figures, and in which prominent aspects and features of the invention are illustrated.

DETAILED DESCRIPTION

In optics, the term "caustic" refers to an envelope of light rays reflected or refracted by one or more surfaces, at least one of which is curved, as well as to projection of such light rays onto another surface. More specifically, a caustic is the curve or surface tangent to each light ray, defining a boundary of an envelope of rays as a curve of concentrated light. For example, the light pattern formed by sunrays at the bottom of a pool is a caustic "image" or pattern formed by a single refractive light-redirecting surface (the wavy air-water interface), whereas light passing through the curved surface of a water glass creates a cusp-like pattern on a table on which the water glass is resting as it crosses two or more surfaces (e.g. air-glass, glass-water, air-water . . . ) which redirect its path.

In the following, the most common configuration where the (refractive) optical (security) element is bound by one curved surface and one flat surface will be used as an example, without restricting the more general cases. We will here refer to a more general "caustic pattern" (or "caustic image") as the light pattern formed onto a screen (projection surface) when a suitably shaped optical surface (i.e. having an appropriate relief pattern) redirects light from a source to divert it from some regions of the screen, and concentrate it on other regions of the screen in a pre-determined light pattern (i.e. thus forming said "caustic pattern"). Redirection refers to the change of path of light rays from the source in the presence of the optical element with respect to the path from the source to the screen in the absence of the optical element. In turn, the curved optical surface will be referred to as "relief pattern", and the optical element that is bound by this surface will be referred to as optical security element. It should be noted that the caustic pattern may be the result of redirection of light by more than one curved surface and more than one object, although possibly at the price of increased complexity. Moreover, a relief pattern for generating a caustic pattern must not be confused with a diffractive pattern (like, for example, in security holograms).

According to the invention, it was found that this concept may be for example applied to common objects, such as consumer products, ID/credit cards, banknotes, and so on. To do so, it is required drastically shrinking down the size of an optical security element, and in particular bringing the relief depth below acceptable values. However, it was found that although the relief was strongly limited in depth, it was still possible to achieve an approximation of a selected (digital) image (representing a reference pattern) on a projection surface of a sufficient quality to allow visual recognition of the selected image from the visually observed caustic pattern on the projection surface (or screen). Such a recognition of a reference pattern directly from a mere visible caustic pattern on a screen, as projected from an optical security element of which design and machining are quite challenging (and thus, make very difficult counterfeiting), constitute a valuable security test allowing reliable authentication of an object marked with this optical security element.

In this description under "relief" should be understood the existence of a height difference (as measured along an optical axis of the optical security element) between the highest point and lowest point of a surface, in analogy with the difference of altitude between the bottom of a valley and the top of a mountain (i.e. as "peak to valley" scale).

According to a preferred embodiment of the invention the maximum depth of the relief pattern of the optical security element is ≤250 µm or more preferably ≤30 µm, while being above the limit imposed by ultra precision machining (UPM) and reproduction process, i.e. about 0.2 µm. According to this description, the height difference between the highest and lowest point in the relief pattern on the light-redirecting surface is referred to as relief depth δ.

In this description several terms are used, which are defined further below.

A caustic pattern (image), forming an approximation of a digital image, should be understood as a light pattern projected by an optical security element, when illuminated by a suitable (preferably, but not necessarily point-like) source. As mentioned above, the optical (security) element should be understood as the slab of refractive material responsible for creating the caustic image.

A light-redirecting surface(s) is the surface (or surfaces) of the optical security element responsible for redirecting the incoming light from a source onto a screen, or (preferably flat) projection surface, where the caustic pattern is formed.

An optical material substrate, used to make an optical (security) element, is raw material substrate of which a surface is specifically machined so as to have a relief pattern and thus form a light-redirecting surface. In case of a reflective light-redirecting surface, the optical material substrate is not necessarily homogeneous or transparent. For example, the material may be opaque to visible light (reflectivity is then obtained by classical metallization of the machined surface). In case of a refractive light-redirecting surface, the raw material substrate is transparent (or partially transparent) and homogeneous with a refractive index n (for photons of the spectrum visible to a human eye), and the corresponding light-redirecting surface is named "refractive transparent or partially transparent light-redirecting surface of refractive index n".

A master according to this description is the first physical realization of a light-redirecting surface from a calculated profile (particularly, from a calculated relief pattern). It can be replicated into several copies (tools) which are then used for mass replication.

A point-like source as used in this description is a source of light whose angular size (from the point of view of the optical security element), is sufficiently small that light can be considered to arise from a single point at a distance $d_s$ from the light-redirecting surface. As a rule of thumb, this means that the quantity: (source diameter)×$d_i$/$d_s$, is smaller than the desired resolution (e.g. 0.05-0.1 mm) of the target caustic pattern on a projected image on the projection surface at a distance $d_i$ from the light-redirecting surface (see FIG. 1). The screen should be understood as the surface on which the caustic pattern is projected. The distance between source and the light-redirecting surface is also named as source distance $d_s$ and the distance between the light-redirecting surface and the screen is named as image distance $d_i$.

The term tool (or replication tool, when it is necessary to remove ambiguity) is mainly used for the physical object carrying the profile of a light-redirecting surface that is used for mass replication. It can be for example to produce a copy of a master surface (the original relief being reproduced, by embossing or injection, from the master carrying the corresponding inverted relief). For the tool used to machine the relief pattern of the light-redirecting surface, the term machining tool is used to remove ambiguity.

Figure 1:
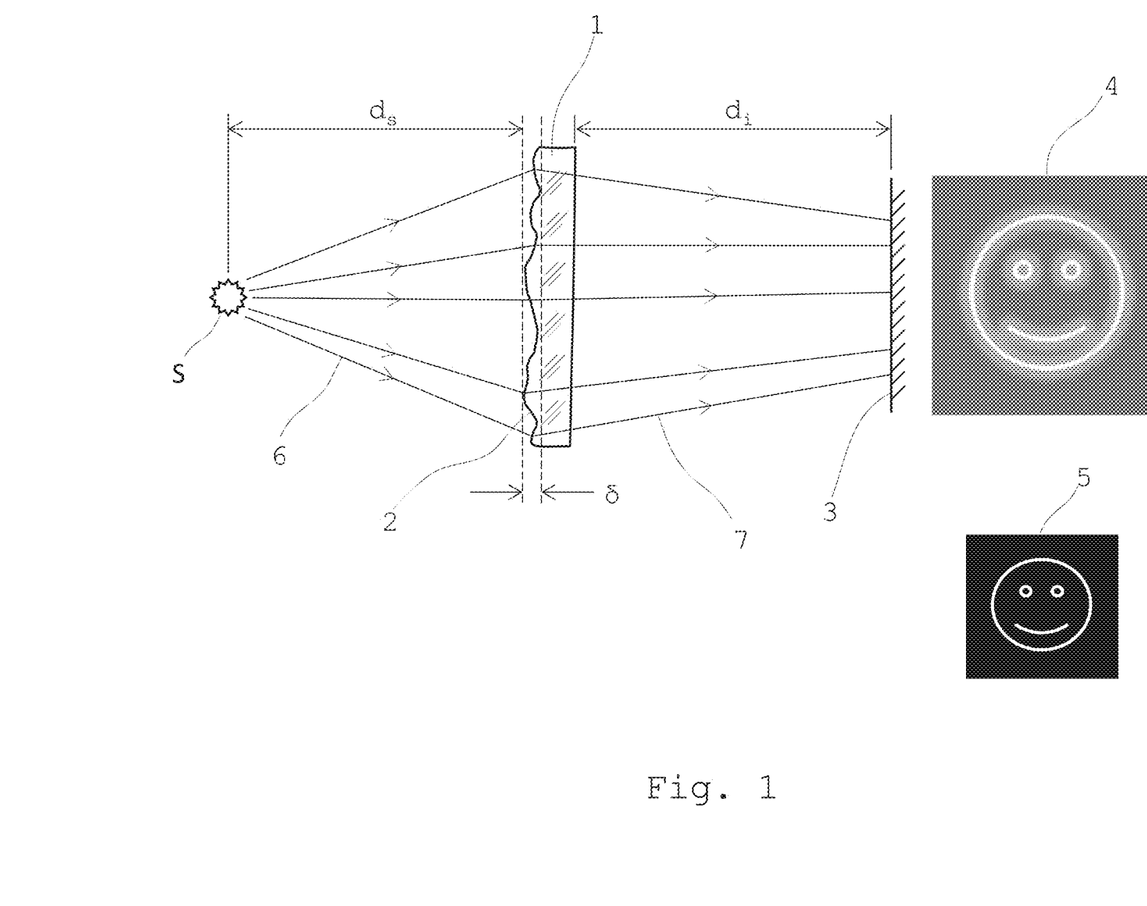
FIG. 1 is a schematic illustration of an optical configuration of a refractive optical element for projecting of a caustic pattern according to a preferred embodiment of the invention.

According to a preferred embodiment of the invention it is provided an optical security element (1) having reflective or refractive surfaces, to redirect light from a point-like source S and project it onto a suitable screen (3), which could be any (mostly flat) surface, or (flat part of) any object, etc. where a meaningful image is formed, as shown in FIG. 1. A special design of the light-redirecting surface may allow projecting a (recognizable) caustic pattern on a curved surface. The image could be for example a logo, a picture, a number, or any other information that may be relevant in a specific context. Preferably, the screen is a flat projection surface.

The configuration of FIG. 1 shows that light from a source S is redirected by a suitably shaped optical surface having a relief pattern (2). This general idea is for example known from reflective surfaces for car headlights, reflectors and lenses for LED illumination, optical systems in laser optics, projectors and cameras: however, usually, the goal is to transform a non-homogeneous distribution of light into a homogeneous one. By contrast, a goal of the invention is to obtain a non-homogeneous light pattern, i.e. a caustic pattern, which (approximately) reproduces some regions of relative brightness of a reference pattern (as represented on a (digital) reference image): if the illuminated relief pattern (2) of the optical element allows forming a caustic pattern (4) on the screen (3) reproducing with sufficient quality (possibly differing by an overall intensity scaling factor) a known reference pattern (5), then a person visually observing the caustic pattern on the screen will easily see if it constitutes or not a valid reproduction of the reference pattern and, in case the caustic pattern is similar enough to the reference pattern, will consider that the object marked with the optical security element is (most probably) genuine.

According to the embodiment of FIG. 1 light rays (6) from a light source S, which is a point-like source according to this example, propagate to an (refractive) optical security element (1) at a source distance $d_s$ with a light-redirecting surface having a relief pattern (2). The optical security element is here made of a transparent or partially transparent homogeneous material of refractive index n. A so called caustic pattern (4) is projected on a screen (3) at an image distance $d_i$ from the light-redirecting surface of the optical security element (1). Authenticity of the optical security element (and thus, that of the object marked with this security element) can be evaluated directly by visually checking a degree of resemblance between the projected caustic pattern and the reference pattern.

Preferably, the relief pattern (2) is first calculated starting from a specified target digital image of a reference pattern. Methods for such calculations are, for example, described in the European patent applications EP 2 711 745 A2 and EP 2 963 464 A1. From that calculated relief pattern, a corresponding physical relief pattern can be created on a surface of suitable optical material substrate (e.g. a transparent or partially transparent material of refractive index n, or a reflective surface of opaque material), using Ultra Precision Machining (UPM). In case of machining a relief on a surface of an opaque optical material substrate to form a reflective surface, a good reflectivity will be obtained by a further conventional operation of depositing a thin layer of metal (metallizing) on the relief. UPM uses diamond machining tools and nanotechnology tools to achieve very high accuracy so that the tolerances can reach "sub-micron" level or even "nano-scale" level. In contrast to this, "High Precision" in traditional machining refers to tolerances of microns in the single-digits. Other potentially suitable techniques to create a physical relief pattern on a surface are laser ablation, and grayscale lithography. As known in the domain of micro-fabrication, each of these techniques has different strengths and limitations, in terms of cost, precision, speed, resolution, etc. Generally, a calculated relief pattern for generating a caustic pattern has a smooth profile (i.e. without discontinuities) with a typical depth of at least 2 mm, for an overall size of 10 cm×10 cm.

A suitable optical material substrate for a refractive light-redirecting optical element should be optically clear, transparent or at least partially transparent, and mechanically stable. For the purpose of the invention, i.e. providing a thin optical security element capable to generate a visually recognizable caustic pattern, a transparent or partially transparent material in fact corresponds to a low haze (H) and high transmittance (T) material, such that light diffusion does not impair forming a visually recognizable caustic pattern. Typically a transmittance T≥50% is preferred, and T≥90% is most preferred. Also, a low haze H≤10% can be used, but H≤3% is preferred and H≤1% is most preferred. A suitable optical material substrate should also behave correctly during the machining process, so as to give a smooth and defect-free surface. An example of a suitable substrate is an optically transparent slab of PMMA (also known under the commercial names of Plexiglas, Lucite, Perspex, etc.). For reflective caustic light-redirecting optical elements, a suitable optical material substrate should be mechanically stable, and it should be possible to give it a mirror-like finish. An example of a suitable substrate is a metal, such as those used for masters of ruled gratings, and laser mirrors, or a non-reflective substrate which can be further metallized.

For large scale production, further steps of tool creation and mass replication of the optical security element on a target object are required. A suitable process for tool creation from a master is, e.g. electroforming. Suitable processes for mass replication are, e.g. hot embossing of a polymer film, or UV casting of a photo-polymer. Note that for the purpose of mass replication neither the master nor the tool derived from it need to be optically transparent, hence opaque materials (notably, metals) can also be used even when the final product is a refractive optical element. Nevertheless, in some cases it might be advantageous that the master is transparent, as it allows checking the quality of the caustic image before proceeding with tooling and mass replication.

A critical aspect for the use of optical elements (with light-redirecting surface having relief pattern) as security features is their physical scale, which must be compatible with the target object, and the optical configuration required to project the caustic image.

In general, for this kind of use the maximum lateral size is limited by the overall size of the object and may usually range from a few cm to less than 1 cm in less favorable cases. For certain uses, like for example for banknotes, the targeted overall thickness can be extremely small (of the order of 100 μm or less). Furthermore, admissible thickness variations (relief) are even smaller, for a variety of reasons, including mechanical constraints (weak spots associated with the thinner areas) and operational considerations (e.g. when stacking-up banknotes, the pile will bulge corresponding to the thicker portion of the bill, which complicates handling and storage). Typically, for a banknote of overall thickness of about 100 μm, a target thickness for the relief pattern of an optical security element to be included in this banknote may be of about 30 μm. For a credit card or an ID card of about 1 mm thickness, a target thickness for the relief pattern of an optical security element to be included in this credit/ID card may be of less than about 400 μm and preferably of no more than about 250 μm.

Furthermore, the source- and image-distance, are generally limited by user comfort to a few tens of centimeters. Notable exceptions are the sun or a spot light mounted on the ceiling, which however are less readily available under certain circumstances. Also, the ratio $d_s/d_i$ between the two distances is typically larger than 5 to 10, so as to obtain a sharper image (and with good contrast) that is easier to recognize. Moreover, the ratio $d_s/d_i \geq 5$ together with a light source S being preferably point-like (e.g. illumination LED of a conventional mobile phone) allows considering that the light source is in fact approximately "at infinity" and thus, a projection surface at only approximately the focal distance from the optical security element will be suitable for a clear viewing of a projected caustic pattern. As a consequence, the conditions of good visual observation by a user do not require a too strict relative spatial arrangement of the light source, the optical security element and the user's eyes.

In general, thickness and relief are among the most critical parameters. Given an arbitrary target image (reference pattern) and optical geometry configuration (i.e. geometric conditions for illumination/observation of projected caustic pattern), there is no guarantee that the calculated optical surface will have a relief pattern below a prescribed limit. In fact, in the general case, the opposite is likely to happen: this is particularly true with the severe imposed constraints for optical security elements described above. Given that numerical simulations to optimize optical surfaces are expensive in terms of time and resources, excessive trial-and-error is not a viable option, and it is highly desirable to ensure that one can obtain a useful result at the first attempt—or at least with only a small number of attempts. It is also highly desirable not to be limited in the choice of a target image, as not all target images are compatible with smooth relief patterns of low depth.

Thus, in view of the great difficulty to directly calculate a relief pattern of very thin depth for controlling the machining of a corresponding relief pattern of depth $\delta_f$ on a surface of an optical material piece to arrive at a light-redirecting surface of a thin optical security element (e.g. with relief pattern depth below 250 μm), under the additional severe constraint that the resulting optical security element must be capable, under proper illumination by a light source (preferably a point-like one) at a certain distance $d_s$ from the light-redirecting surface, to redirect incident light and form a projected image containing a caustic pattern on a projection surface (at a certain distance $d_i$ from the light-redirecting surface), with this caustic pattern reproducing a given reference pattern with sufficient precision so as to be visually recognizable by a person, either with mere naked eye or at most with commonly and easily available means (e.g. with a magnifying lens), a new way of calculating such a relief pattern is proposed.

According to the invention, it has been observed that it is possible to use a calculated relief pattern profile having discontinuities for controlling (guiding) the machining of a surface of an optical material piece to reproduce a corresponding relief pattern and thus arrive at a light-redirecting surface capable to redirect an incident light and form a projected image containing a caustic pattern on a projection surface, with this caustic pattern reproducing a given reference pattern with sufficient precision so as to be visually recognizable by a person. Numerous tests confirmed that the introduced discontinuities in fact do not heavily impact the capability of forming a recognizable caustic pattern: only slight shadows may appear due to the discontinuities which do not affect the rest of the projected caustic pattern. Moreover, the tests confirmed that a relief profile with discontinuities gives much more freedom with respect to the choice of a target reference pattern. The result of the machining process (e.g. UPM) is a machined relief profile with abrupt variations corresponding to the discontinuities of the calculated one, as, due to the limited precision of the machining tool, the obtained profile cannot strictly reproduce the discontinuities, which are thus somewhat "smoothed". That sort of calculated relief pattern profile has the great advantage to allow forming an optical security element of reduced thickness by adapting a method known since Fresnel to produce thin lenses (i.e. "Fresnel lenses") from an initial (thick) plano convex lens profile, while approximately preserving the optical properties associated with the initial profile (i.e. such that a collimated beam converges to the same focal point). According to the Fresnel's method, discontinuities strictly circular concentric with respect to the lens optical axis and the lens optical center are formed in the lens profile resulting into several circular concentric zones of the profile, and profile portions above the zones are then collapsed along the concentric discontinuities so as to form an "equivalent lens profile" having the same optical characteristics, i.e. same optical axis, same optical center, same focal distance and delivering (approximately) same light beam homogeneity, but with reduced thickness.

By contrast with the classical Fresnel method which tries to maintain light beam homogeneity, it has been tested that the method according to the invention allows maintaining the light inhomogeneities producing the caustic patterns. Moreover, according to the invention, most of the constraints in the Fresnel's method are relaxed: particularly, there is no consideration of an optical center and the zones formed in the profile are not necessarily concentric (nor even circular) with respect to the optical axis, thus allowing to freely dividing a relief pattern profile into adjacent regions and machining corresponding regions at a surface of an optical material piece to provide light-redirecting surfaces. Such a degree of freedom makes much easier the adaptation of a relief pattern profile in order to reproduce a given reference pattern, while still allowing thickness reduction. Particularly, this approach is adapted to modify an initially calculated (generally continuous, i.e. smooth) relief profile having a depth $\delta_i$ much too thick for producing an optical security element of very low target depth $\delta_f$, but which nevertheless meets all the requirements to provide a light-redirecting surface of an optical element capable to form a projected image containing a caustic pattern reproducing a given reference pattern (visually recognizable) on a projection surface. Such an initial relief profile for machining of a light-redirecting surface is illustrated on FIG. 2(A).

Figure 2:
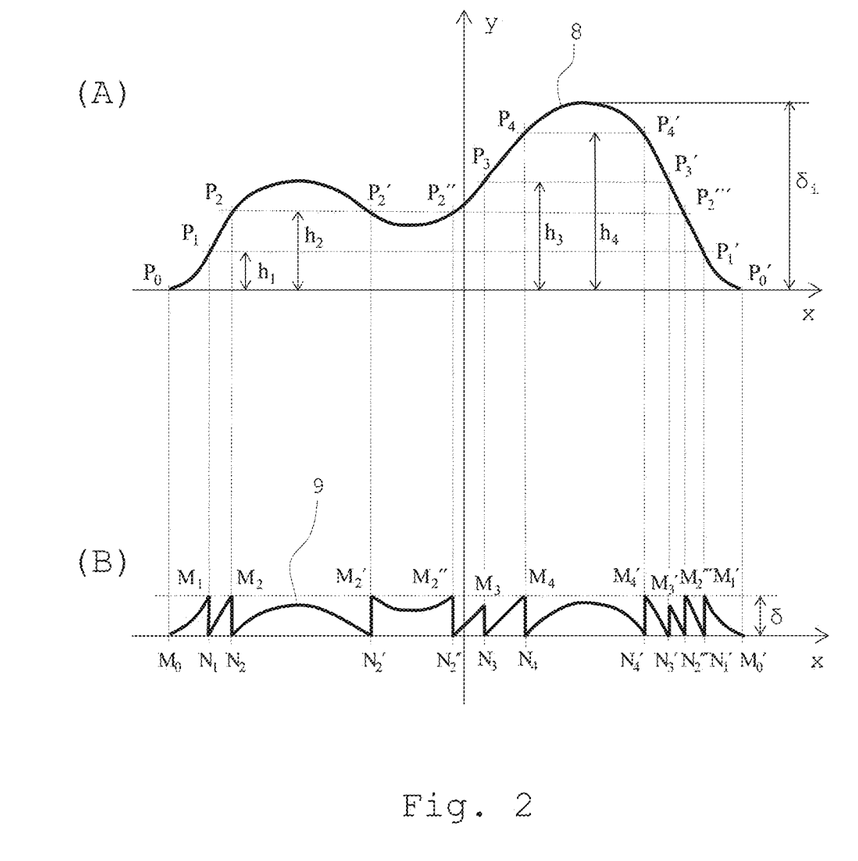
FIG. 2(A) illustrates a cross section view of a two-dimensional initial relief pattern profile.
FIG. 2(B) illustrates a cross section view of a calculated two-dimensional relief pattern profile having discontinuities and obtained from the initial relief pattern of FIG. 2(A), according to the invention.

According to the invention, as illustrated on FIG. 2(A), a cross section of an (two-dimensional) initial relief pattern profile (8) extending over a base plane is represented in the coordinate system (X, Y) with height axis Y (ordinate) corresponding to an optical axis of the corresponding light-redirecting surface and abscissa X in the base plane. The cross section corresponds to a (one-dimensional) curve (8) showing the maximum depth $\delta_i$ of the initial relief pattern. A slicing of the initial relief pattern profile is performed: here, the slicing corresponds to planes perpendicular to the optical axis Y which intersect the relief pattern at given heights $h_1$, $h_2$, $h_3$ and $h_4$ (of increasing values along axis Y, and preferably equally spaced) along lines of which respective traces in the cross section profile (8) determine some intersection points $P_1$, $P'_1$, $P_2$, $P'_2$, $P''_2$, $P'''_2$, $P_3$, $P'_3$, $P_4$ and $P'_4$. Points $P_0$ and $P'_0$ correspond to intersections with the base plane. Other slicings are possible (depending on choices regarding the location of the resulting intersection lines on the initial relief pattern profile), like the one obtained by the intersections of cylindrical surfaces (i.e. topologically equivalent to straight circular cylinders), having axis along Y, with the initial relief pattern profile.

Each slicing plane defines zones comprised under the profile (8) and between subsequent slicing planes: here, a zone on the base plane, i.e. on the slicing plane at height $h_0=0$, with intersection points $P_0$ and $P'_0$, which has a two parts corresponding to the two portions of the profile curve (8) between the base plane and the (next) first slicing plane (at height $h_1$), with intersection points $P_1$ and $P'_1$, i.e. the first part corresponds to the first portion of the profile curve (8) between the points $P_0$ and $P_1$, and the second part corresponds to the second portion between points $P'_0$ and $P'_1$;

a zone on the first slicing plane, with intersection points $P_1$ and $P'_1$ at height $h_1$, which has a three parts corresponding to the three portions of the profile curve (8) between the first slicing plane and the (next) second slicing plane (at height $h_2$), with intersection points $P_2$, $P'_2$, $P''_2$ and $P'''_2$, i.e. the first part corresponds to the first portion of the profile curve (8) between the points $P_1$ and $P_2$, the second part corresponds to the second portion of the profile curve (8) between points $P'_2$ and $P''_2$, and the third part corresponds to the third portion of the profile curve (8) between points $P'_1$ and $P'''_2$;

a zone on the second slicing plane, with intersection points $P_2$, $P'_2$, $P''_2$ and $P'''_2$ at height $h_2$, which has a three parts corresponding to the three portions of the profile curve (8) between the second slicing plane and the (next) third slicing plane (at height $h_3$), with intersection points $P_3$ and $P'_3$, i.e. the first part corresponds to the first portion of the profile curve (8) between the points $P_2$ and $P'_2$, the second part corresponds to the second portion of the profile curve (8) between points $P''_2$ and $P_3$, and the third part corresponds to the third portion of the profile curve (8) between points $P'''_2$ and $P'_3$;

a zone on the third slicing plane, with intersection points $P_3$ and $P'_3$ at height $h_3$, which has a two parts corresponding to the two portions of the profile curve (8) between the third slicing plane and the (next) fourth slicing plane (at height $h_4$), with intersection points $P_4$ and $P'_4$, i.e. the first part corresponds to the first portion of the profile curve (8) between the points $P_3$ and $P_4$, and the second part corresponds to the second portion between points $P'_3$ and $P'_4$; and a zone on the fourth slicing plane, with intersection points $P_4$ and $P'_4$ at height $h_4$, which has only one part corresponding to the only one portion of the profile curve (8) above the fourth slicing plane, i.e. the part corresponding to the portion of the profile curve (8) between the points $P_4$ and $P'_4$.

The number of slicing planes, and their different heights, are chosen in view of the target reduction of the profile depth $\delta_i$. For example, a reduction factor such as 10 can be easily obtained in view of using high precision machining.

In case of a slicing resulting from intersections of the relief pattern profile with cylindrical surfaces, each line corresponding to a trace of an intersection is clearly not at a constant height value, and thus the corresponding height value to be considered for translation to the base plane is the lowest one along the line.

Then, a "collapse" on the base plane is realized by translating (as a single unit, and parallel with the optical axis Y) each portion of the profile curve (8) comprised above a corresponding part of a zone on a slicing plane at height $h_i$ (i=0, . . . , 4), toward the base plane by a distance of value $h_i$. The result is a "collapsed" (or reduced) relief pattern profile (9) of reduced depth δ, as shown on FIG. 2(B), wherein:

the portions of the profile curve (8) between the points $P_0$ and $P_1$, respectively $P_0'$ and $P_1'$, above the slicing plane at height $h_0=0$, are translated by a distance value 0 to obtain the portions of the reduced profile (9) comprised between points $M_0$ and $M_1$, respectively $M_0'$ and $M_1'$, with profile discontinuities at $M_1$ and $M_1'$, and with corresponding discontinuity traces on the base plane at respective points $N_1$ and $N_1'$;

the portions of the profile curve (8) between the points $P_1$ and $P_2$, respectively $P_2'$ and $P_2''$, $P_1'$ and $P_2'''$, above the slicing plane at height $h_1$, are translated by a distance value $h_1$ to obtain the portions of the reduced profile (9) comprised between points $N_1$ and $M_2$, respectively $M_2'$ and $M_2''$, $N_1'$ and $M_2'''$, with profile discontinuities at $M_2$, $M_2'$, $M_2''$ and $M_2'''$, and with corresponding traces on the base plane at respective points $N_2$, $N_2'$, $N_2''$ and $N_2'''$;

the portions of the profile curve (8) between the points $P_2$ and $P_2'$, respectively $P_2''$ and $P_3$, $P_2'''$ and $P_3'$, above the slicing plane at height $h_2$, are translated by a distance value $h_2$ to obtain the portions of the reduced profile (9) comprised between points $N_2$ and $N_2'$, respectively $N_2''$ and $M_3$, $N_2'''$ and $M_3'$, with profile discontinuities at $M_3$ and $M_3'$, and with corresponding traces on the base plane at respective points $N_3$ and $N_3'$;

the portions of the profile curve (8) between the points $P_3$ and $P_4$, respectively $P_3'$ and $P_4'$, above the slicing plane at height $h_3$, are translated by a distance value $h_3$ to obtain the portions of the reduced profile (9) comprised between points $N_3$ and $M_4$, respectively $N_3'$ and $M_4'$, with profile discontinuities at $M_4$ and $M_4'$, and with corresponding discontinuity traces on the base plane at respective points $N_4$ and $N_4'$; and the portion of the profile curve (8) between the points $P_4$ and $P_4'$ above the slicing plane at height $h_4$, is translated by a distance value $h_4$ to obtain the portion of the reduced profile (9) comprised between points $N_4$ and $N_4'$.

There are limitations regarding the number of slicing planes and their heights in the above method of calculating a relief profile relate to the respective sizes of the different profile portions comprised between the points $M_0$ and $N_1$, $N_1$ and $N_2$, $N_2$ and $N_2'$, $N_2'$ and $N_2''$, $N_2''$ and $N_3$, $N_3$ and $N_4$, $N_4$ and $N_4'$, $N_4'$ and $N_3'$, $N_3'$ and $N_2'''$, $N_2'''$ and $N_1'$, $N_1'$ and $M_0$ on the base plane: these sizes must be above the diffraction limit (for visible light) so that the projected caustic pattern is still visually recognizable (i.e. is not spoiled, e.g. by chromatic aberrations). A further limitation relates to draft-losses at the level of the discontinuities due to loss of incoming light caused by incidence on the corresponding draft facets of the machined relief profile.

As a result of the "cutting and collapsing" operation, the calculated relief profile (9) with discontinuities has a reduced relief pattern depth δ much less than $δ_i$, and thus the correspondingly machined relief pattern will also have a reduced depth $δ_f$ and will show abrupt variations corresponding to the discontinuities of the calculated relief profile (9).

Thus, according to the invention, the operations of designing a relief pattern of very low depth $δ_f$ to form a light-redirecting surface on an optical material substrate, so as to provide an optical security element capable to meet the above mentioned visual recognition criterion (with respect to a given reference pattern), are greatly facilitated, as it is possible to start the process with a thick initial relief pattern profile with $δi \gg δ_f$, i.e. not complying with the severe thickness requirement for an optical security element but otherwise capable to generate (via machining of a surface of an optical material) a visually recognizable projection of a caustic pattern, and form a corresponding discontinuous relief pattern profile of reduced depth and capable to provide a thin optical security element (of given target depth), without necessitating to perform some tests for verifying that machining of an optical material will provide a suitable optical security element, and avoiding having to modify (or even reject) a candidate reference pattern so that an accordingly calculated relief pattern profile is indeed compatible with a visually recognizable projection of a corresponding caustic pattern.

Figure 3:
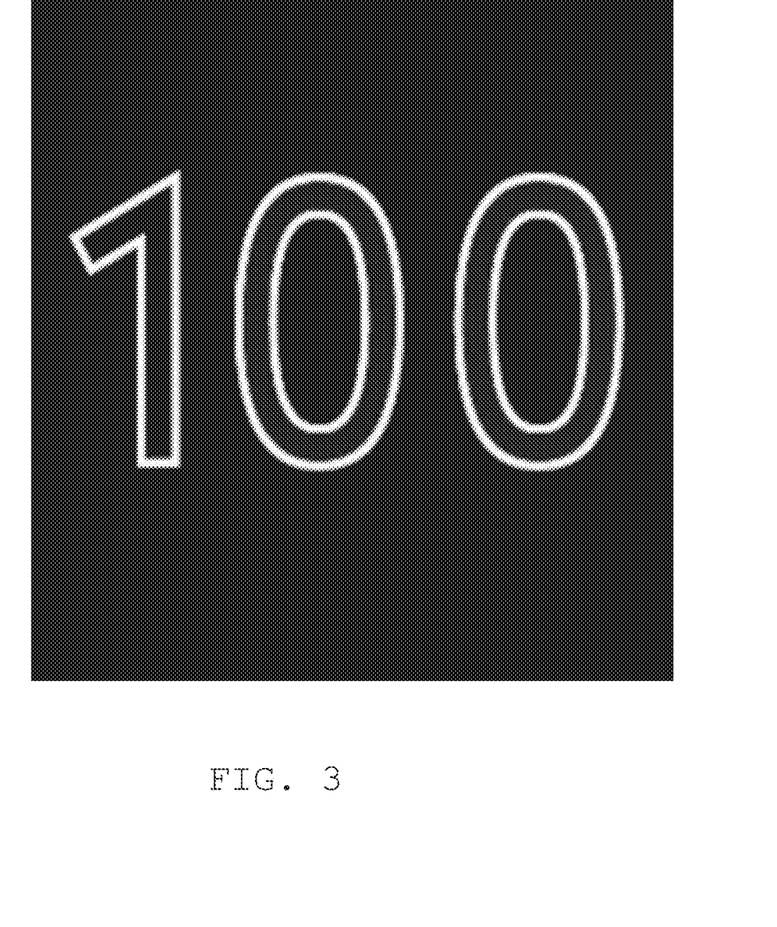
FIG. 3 illustrates an example of reference pattern (with a pattern representing the number 100 on a dark background).

FIG. 3 is an example of reference pattern representing the number 100 over a dark background.

Figure 4A:
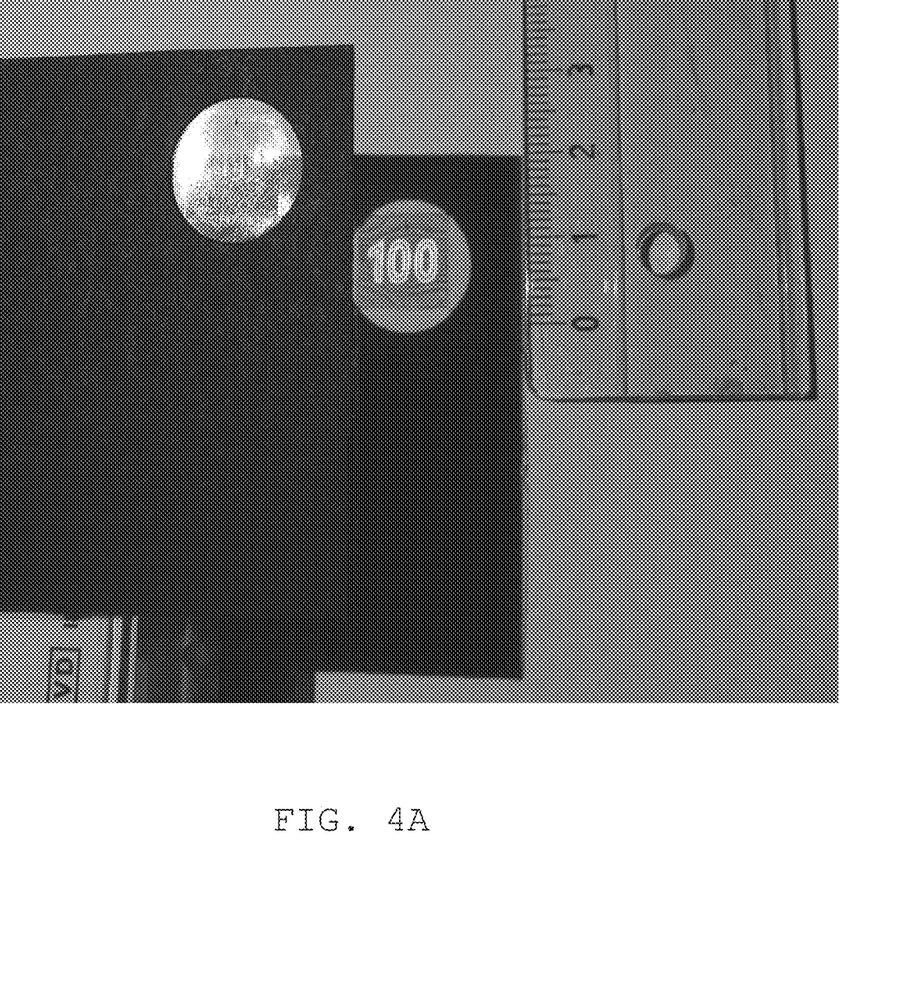
FIG. 4A is a view of a thin transparent refractive optical security element designed on a foil substrate (foreground) together with a corresponding projected caustic pattern (background).

FIG. 4A shows a photograph of a realization of a very thin optical security element according to the invention (i.e. the transparent part of the front-most object in the image) having a refractive light-redirecting surface with a relief pattern of depth δ=30 μm that has been UV cast on a transparent refractive foil material according to the invention. The overall depth of the optical security element is of 100 μm, its area A being of 1 cm². The refractive material of the foil has a refractive index n about 1.5 and is made of polyester. The refractive index of the resin used for forming the relief pattern is also about 1.5. Also shown (in background) is the projected caustic pattern (i.e. the number 100) on a screen (see also FIG. 4B), with shadow lines corresponding to the abrupt variations of the machined relief pattern. The reference pattern is that of FIG. 3.

Figure 4B:
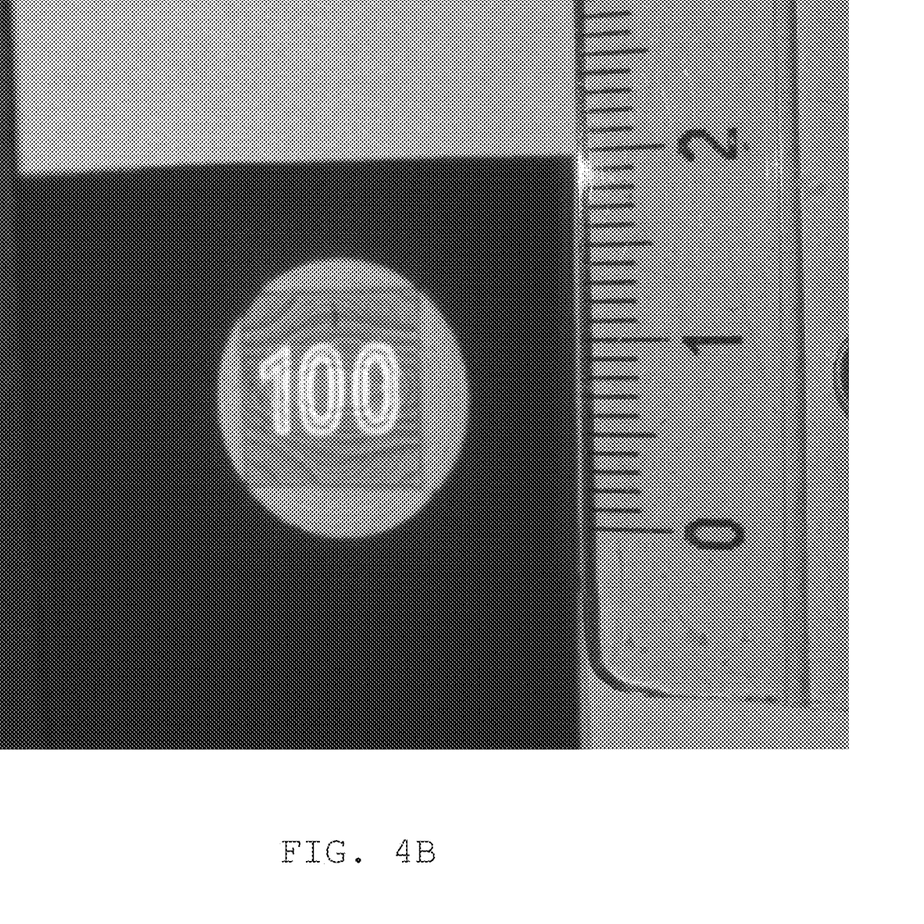
FIG. 4B is a photograph of caustic pattern projected by the optical security element shown in the foreground of FIG. 4A.

FIG. 4B is a photograph showing details of the caustic pattern projected by the optical security element of FIG. 4A. Here, the point-like light source is a LED at a distance $d_s=30$ cm from the light-redirecting surface, and the flat screen on which the caustic pattern is projected is at a distance $d_i=40$ mm. The caustic pattern neatly reproduces the pattern of the number 100 of the reference pattern of FIG. 3.

Figure 5A:
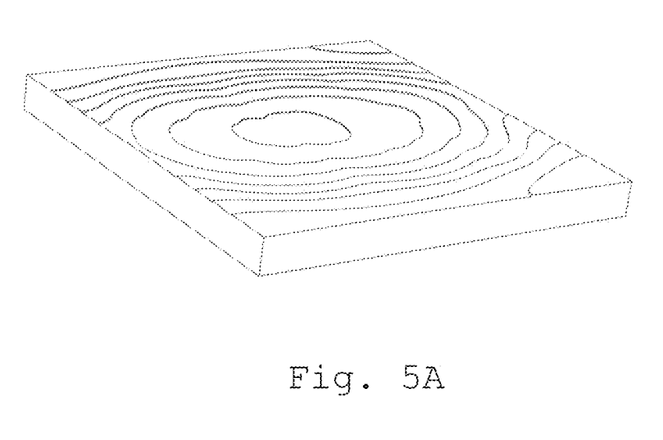
FIG. 5A is a perspective view of a relief pattern with contours corresponding to discontinuities of a calculated relief profile for the reference pattern of FIG. 3.

FIG. 5A is a perspective view of a relief pattern with contours corresponding to levelled cuts sustaining 30 μm height, i.e. corresponding to discontinuities of a calculated relief profile for the reference pattern of FIG. 3 (i.e. the number 100).

Figure 5B:
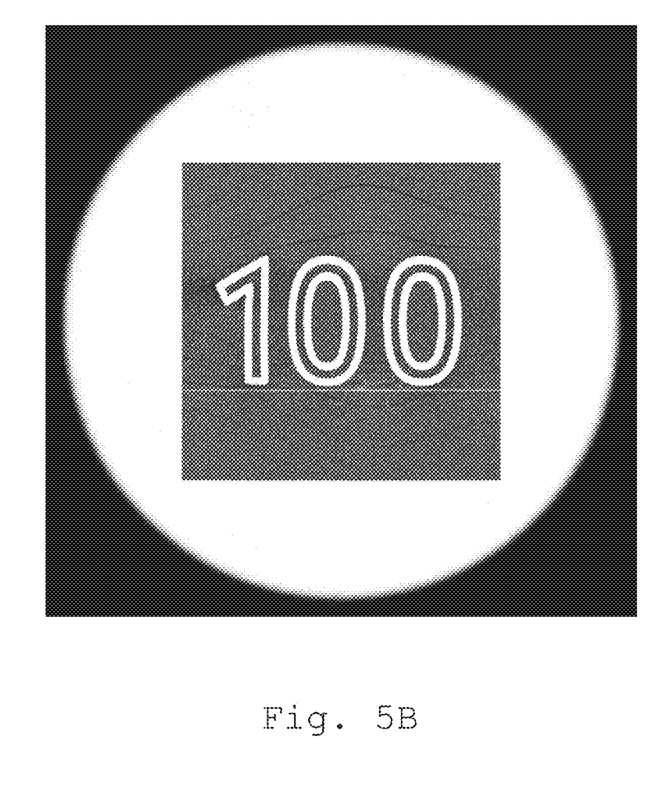
FIG. 5B is a view of the projected caustic pattern corresponding to the relief pattern of FIG. 5A.

FIG. 5B is a view of the projected caustic pattern corresponding to the relief pattern of FIG. 5A: shadow lines corresponding to levelled cuts are clearly visible around the number 100.

Figure 6A:
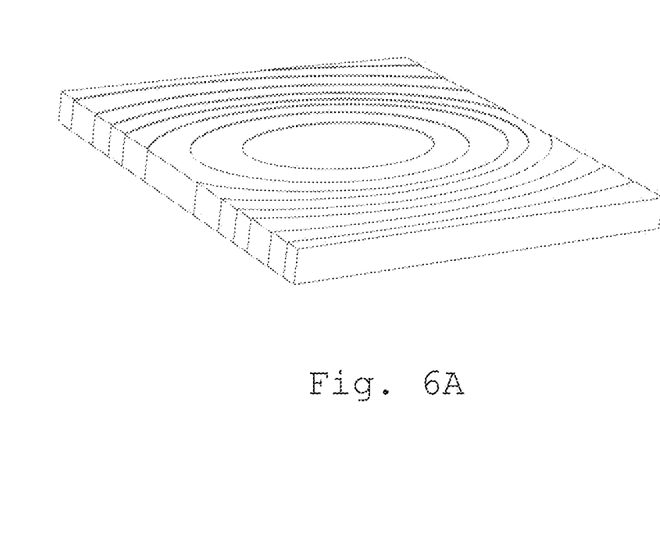
FIG. 6A is a perspective view of a relief pattern with contours corresponding to cuts formed by slicing an initial relief pattern with elliptical cylinders.

FIG. 6A is a perspective view of a relief pattern with contours corresponding to cuts formed by slicing an initial relief pattern with elliptical cylinders sustaining approximately 30 μm height, i.e. corresponding to discontinuities of a relief profile for the reference pattern of FIG. 3 (i.e. the number 100).

Figure 6B:
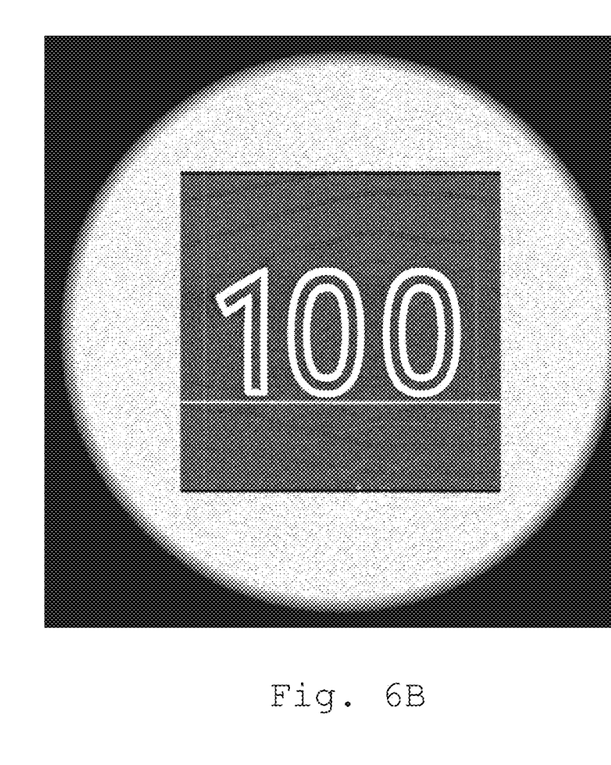
FIG. 6B is a view of the projected caustic pattern corresponding to the relief pattern of FIG. 6A.

FIG. 6B is a view of the projected caustic pattern corresponding to the relief pattern of FIG. 6A and showing shadow lines corresponding to the elliptical cuts.

The above disclosed subject matter is to be considered illustrative, and not restrictive, and serves to provide a better understanding of the invention defined by the independent claims.

The invention claimed is:

1. An optical security element comprising a reflective light-redirecting surface, or a refractive transparent or partially transparent light-redirecting surface, having a relief pattern of depth $δ_f$ adapted to redirect incident light received from a point-light source and form a projected image containing a caustic pattern on a projection surface, said caustic pattern reproducing a reference pattern and being visually recognizable, wherein a profile of the relief pattern has abrupt variations formed by machining a surface of an optical material piece according to a calculated relief pattern profile having discontinuities, said machined abrupt variations corresponding to the discontinuities, wherein the calculated relief pattern profile having discontinuities is obtained by slicing an initial relief pattern profile of a model light-redirecting surface into smaller contiguous profile portions, said initial relief pattern profile having a depth $\delta_i$ greater than $\delta_f$ and being operable to reproduce by optical path simulation said caustic pattern on the projection surface under illumination by the point-light source, the slicing generating a boundary surface between any two contiguous profile portions which extends parallel to an optical axis of said model light-redirecting surface, and by collapsing along the optical axis each profile portion comprised between two consecutive boundary surfaces, thereby forming the calculated relief profile having a discontinuity along each boundary surface, wherein the operation of collapsing a profile portion of the initial relief pattern profile, of which height is measured with respect to the optical axis of said model light-redirecting surface and which extends above a base plane perpendicular to said optical axis, is obtained by translating, parallel to the optical axis and toward the base plane, the profile portion by a distance value corresponding to a minimal height at which its boundary surfaces intersect said profile portion, thereby obtaining the calculated relief profile having a relief pattern of reduced depth less than $\delta_i$.

2. The optical security element of claim 1, wherein the profile of the relief pattern has a low depth $\delta_f$ less than or equal to 30 μm.

3. The optical security element of claim 1, wherein the profile of the relief pattern has a low depth $\delta_f$ less than or equal to 250 μm.

4. The optical security element according to claim 1, wherein the reflective light-redirecting surface, or a refractive transparent or partially transparent light-redirecting surface, is disposed over a flat base substrate, an overall thickness of the optical security element being less than or equal to 100 μm.

5. The optical security element according to claim 1, wherein its relief pattern is adapted to redirect incident light received from the point-light source, at a distance $d_s$ from the reflective light-redirecting surface, or a refractive transparent or partially transparent light-redirecting surface, and form the projected image containing the caustic pattern on the projection surface at a distance $d_i$ from the reflective light-redirecting surface, or a refractive transparent or partially transparent light-redirecting surface, with a value of $d_i$ less than or equal to 30 cm and a value of the ratio $d_s/d_i$ greater than or equal to 5.

6. The optical security element according to claim 1, marking an object selected from the group comprising: consumer products, tax stamps, ID cards, passports, credit cards and banknotes.

7. A method of designing a reflective light-redirecting surface, or a refractive transparent or partially transparent light-redirecting surface, having a relief pattern of depth $\delta_f$, of an optical security element adapted to redirect incident light received from a point-light source and form a projected image containing a caustic pattern on a projection surface, said caustic pattern reproducing a reference pattern and being visually recognizable, comprising:

a) calculating a relief pattern profile having discontinuities; and b) machining a surface of an optical material piece according to the relief pattern profile having discontinuities calculated at a), thereby having a machined profile of the relief pattern with abrupt variations corresponding to the discontinuities of the relief pattern profile calculated at a), wherein, at a), calculating the relief pattern profile having discontinuities further comprises:

slicing an initial relief pattern profile of a model light-redirecting surface into smaller contiguous profile portions, said initial relief pattern profile having a depth $\delta_i$ greater than $\delta_f$ and being operable to reproduce by optical path simulation said caustic pattern on the projection surface under illumination by the point-light source, the slicing generating a boundary surface between any two contiguous profile portions which extends parallel to an optical axis of said model light-redirecting surface; and collapsing along the optical axis each profile portion comprised between two consecutive boundary surfaces, thereby forming the calculated relief profile having a discontinuity along each boundary surface, at a), collapsing a profile portion of the initial relief pattern profile, of which height is measured with respect to the optical axis of said model light-redirecting surface and which extends above a base plane perpendicular to said optical axis, is performed by translating, parallel to the optical axis and toward the base plane, the profile portion by a distance value corresponding to a minimal height at which its boundary surfaces intersect said profile portion, thereby obtaining the calculated relief profile having a relief pattern of reduced depth less than $\delta_i$; and at b), the surface of the optical material piece is machined according to the calculated relief pattern profile of reduced depth less than $\delta_i$, thereby obtaining the machined reflective light-redirecting surface, or a refractive transparent or partially transparent light-redirecting surface, of the optical security element with the relief pattern of reduced depth $\delta_f$ less than $\delta_i$.

8. The method according to claim 7, wherein the machining of the surface of the optical material piece comprises any one of ultra-precision machining, laser ablation and lithography.

9. The method according to claim 7, further comprising that the machined reflective light-redirecting surface, or a refractive transparent or partially transparent light-redirecting surface, is a master light-redirecting surface to be used to build a replica of the light-redirecting surface.

10. The method according to claim 9, further comprising replicating the machined reflective light-redirecting surface, or a refractive transparent or partially transparent light-redirecting surface, on a substrate.

11. The method according to claim 9, wherein replication comprises one of UV casting and embossing.

* * * * *